T. J. STURTEVANT.
SCREEN OR SEPARATOR.
APPLICATION FILED MAR. 1, 1913.

1,141,988.

Patented June 8, 1915.
3 SHEETS—SHEET 1.

T. J. STURTEVANT.
SCREEN OR SEPARATOR.
APPLICATION FILED MAR. 1, 1913.
1,141,988.
Patented June 8, 1915.
3 SHEETS—SHEET 2.
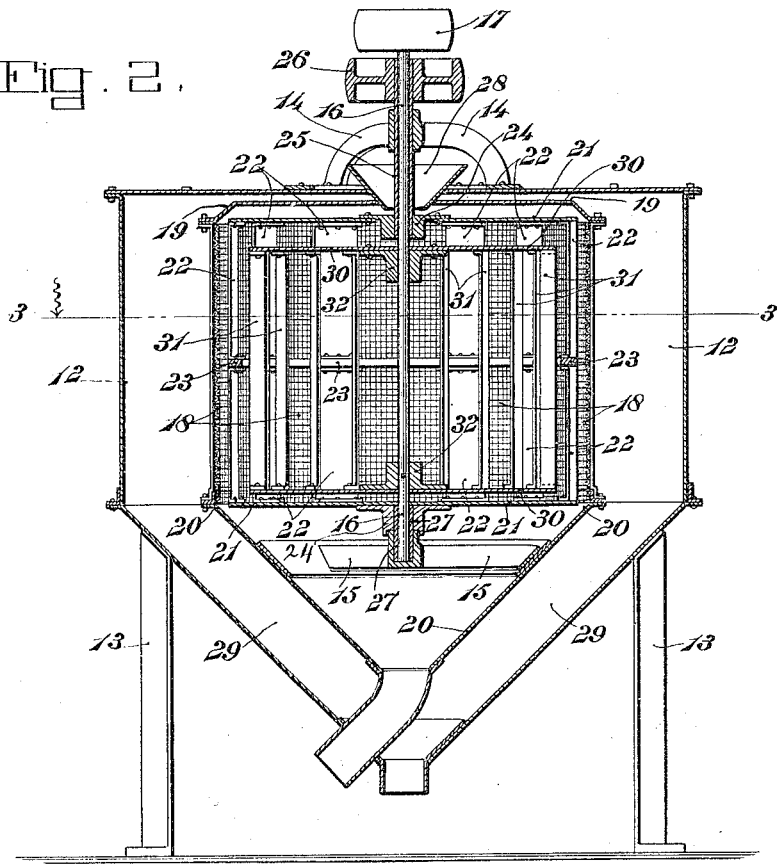
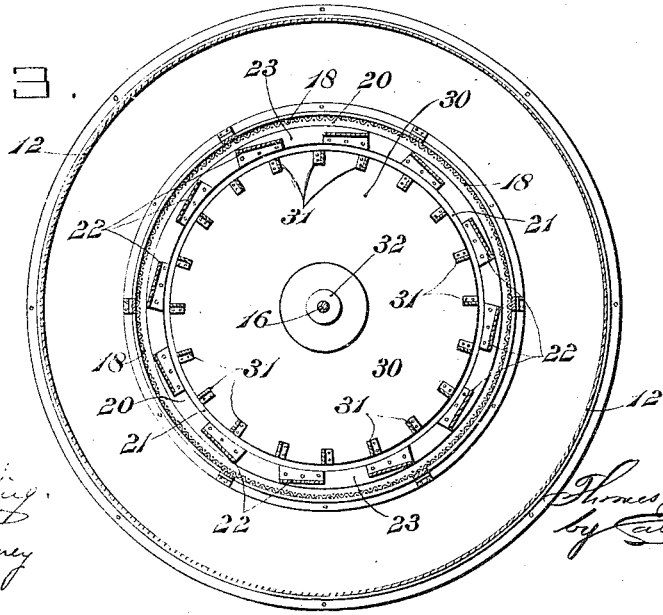
WITNESSES:
INVENTOR:
Attorneys.

UNITED STATES PATENT OFFICE.

THOMAS JOSEPH STURTEVANT, OF WELLESLEY, MASSACHUSETTS, ASSIGNOR TO STURTEVANT MILL COMPANY, A CORPORATION OF MAINE.

SCREEN OR SEPARATOR.

1,141,988.  Specification of Letters Patent.  Patented June 8, 1915.

Application filed March 1, 1913. Serial No. 751,560.

*To all whom it may concern:*

Be it known that I, THOMAS J. STURTEVANT, a citizen of the United States, residing at Wellesley, in the county of Norfolk and State of Massachusetts, have invented or discovered certain new and useful Improvements in Screens or Separators, of which the following is a specification, reference being had therein to the accompanying drawings.

This invention relates to screens or separators and has for its object to provide a separator by means of which the screening operation is expeditiously performed. This result is effected by the assistance of a rotary fan adapted to produce reversing or pulsating air currents which will serve to vibrate the wire mesh screen more or less, and which will act alternately to force fine material through the screen and to clear the screen, so that the meshes thereof will not become clogged by the material being screened.

The present invention relates more particularly to an improved embodiment of the invention set forth in my application No. 740,415, filed Jan. 6, 1913, as will hereinafter more fully appear.

Figure 1:
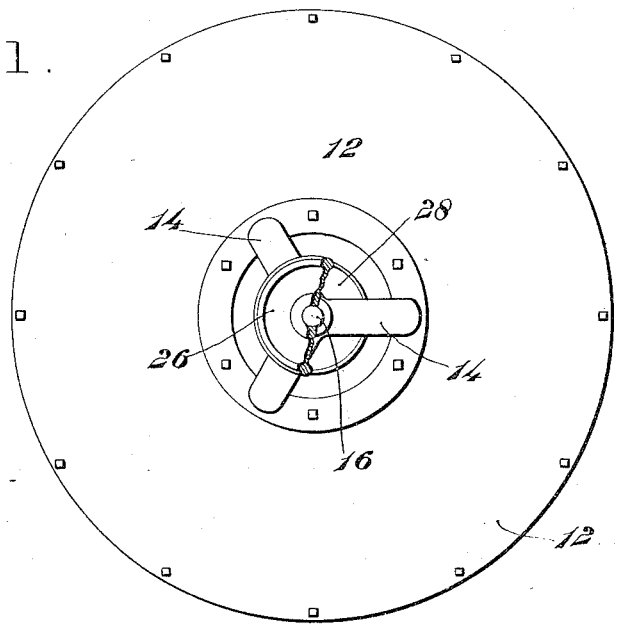
Figure 4:
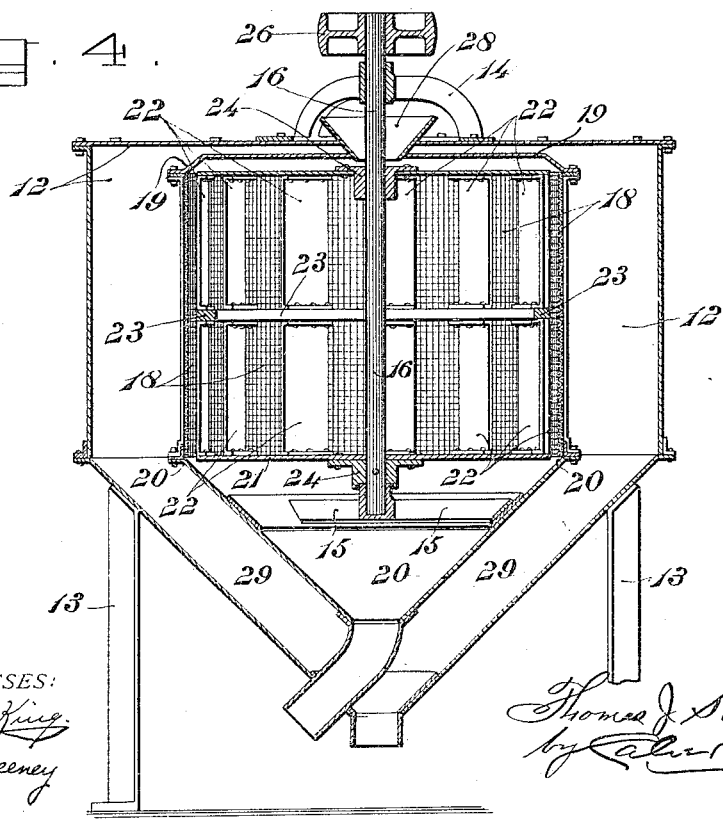
Figure 5:
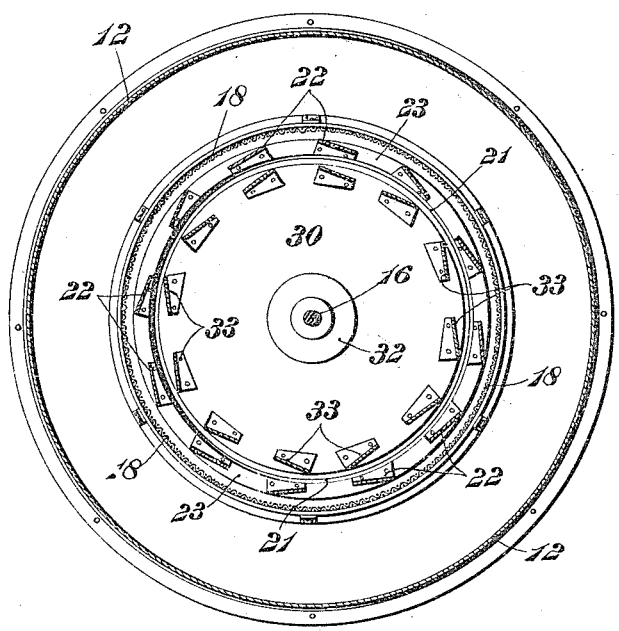

In the accompanying drawings, Figure 1 is a plan view of a screen or separator embodying the present invention, and Fig. 2 is a central vertical section thereof. Fig. 3 is a horizontal section on line 3—3, Fig. 2, and Fig. 4 is a central vertical section of a somewhat different embodiment of the invention from that shown in Figs. 2 and 3. Fig. 5 is a horizontal section illustrating another different form of the invention.

Referring to the drawings, 12 denotes a suitable casing mounted on legs 13. Suitably supported on or within the casing 12 are brackets 14 and 15 which afford bearings for a vertical rotary shaft 16 provided with a pulley 17 by which it may be driven from any suitable source of power. Mounted within the casing 12 is a non-rotating or stationary screen 18 which, as herein shown, is of cylindrical form and consists preferably of fine-mesh wire-cloth which is stretched upon a suitable frame comprising an upper end head 19 and a lower hopper part 20 to receive the tailings from the separator. As herein shown the bracket 14 is mounted on the upper side of the casing 12 while the bracket 15 is mounted on the hopper part 20. It will be understood, however, that the screen may be of polygonal or other suitable form, and that it may be of fine or coarse mesh, depending on the desired output of the screened material.

Mounted within the screen 18 is a rotary fan made in the form of a drum and comprising upper and lower end heads 21 and a series of wings or blades 22 attached to said end heads and to a central bracing ring 23. The said ends heads are provided with hubs 24 which in the form of the invention shown in Fig. 4, are attached directly to the shaft 16 provided with a driving pulley 26, while in the form of the invention shown in Fig. 2 one of said hubs is attached to a hollow shaft 25 provided with a driving pulley 26, the other of said end heads being provided with a sleeve 27 which affords a bearing for one end of the shaft 16. The wings or blades 22 are preferably all disposed in one circular plane and are reversely inclined alternately for the purpose of producing alternating or pulsating air currents which will serve to force fine material through said screen as well as to clear the said screen, by pulsating action, so as to prevent the screen from clogging, and will also serve to vibrate the screen 18 more or less.

In the operation of the improved screen or separator the material to be screened will be fed from a hopper 28 onto the upper end head 21 of the rotary drum fan, and will be carried by centrifugal action outward until it can fall down in the space between the wings or blades of said fan and the cylindrical screen 18. As the material falls into the space referred to the whirling action of the fan will cause the material to travel spirally, while the pulsating air currents created by the fan will cause the fine material to be carried through the screen and into the space within the casing 12 outside of said screen so that it can fall down into the hopper 29 arranged to receive said fine material, the tailings passing downward into the hopper 20 as hereinbefore indicated. From the foregoing it will thus be understood that the upper rotary head 21 of the pulsating current fan acts as a centrifugal distributer for the material to be screened.

Any desired arrangement of the wings or blades 22, for the purpose of creating pulsating or reversing air currents, may be adopted, and while the alternate arrangement of said wings or blades as shown in Fig. 3 is preferred it will be understood that different arrangements might be employed, as by disposing the vertically inclined wings or blades in alternating groups instead of having the same alternate singly. This will be understood from Fig. 5 in which the alternating wings or blades 22 are shown as being in groups of two. This rotary or pulsating air current fan, when in operation, will cause a whirlwind action on the material within the chamber of the separator, so that the material moving spirally downward will come in contact with the screen clothing tangentially and the material will therefore be screened finer than the mesh of the wire clothing, owing to the inclination of the path of the material to the plane of said screen clothing.

For the purpose of modifying or assisting the action of the pulsating or alternating air currents created by the rotary pulsating current fan above described, a second cylindrical or drum-form of fan, preferably arranged within the first-named fan, and comprising end heads 30 and radiating blades 31, may be employed. The end heads 30 are provided with hubs 32 attached, as shown in Fig. 2, to the shaft 16. This second or inner fan, which, as herein shown, is a non-pulsating current fan, will, in practice, be rotated in a direction opposite to the direction of rotation of the outer or pulsating current fan, and will have an effect to increase the power of the air pulsations while reducing the velocity of the whirlwind action, caused by the pulsating current fan, to any desired extent, so as to prevent excessive wear of the wire-cloth screen. In other words, the inner fan, by causing the pulsating fan to work in an opposing current, causes the air to pulsate more strongly. This is due to the fact that if the pulsating fan should move in a whirlwind of air moving at the same rate and in the same direction as the fan blades the latter would not displace any air, and therefore would not cause any air pulsations. It follows, therefore, that in the use of the double fan design the rate of pulsation of the air can be regulated by the speed of the pulsating fan, and the force of the pulsations can be varied by the inside fan which controls more or less the speed of the air currents in which the pulsating fan works. This second fan may, however, be a pulsating current fan if desired, and this may be found preferable for some kinds of work. This will be understood from Fig. 5 which shows a pulsating current fan having alternating reversely inclined wings or blades 33 coöperating with the rotating pulsating current fan having reversely inclined wings or blades 22 disposed, in this particular form of the invention, in alternating groups, as hereinbefore described. The speed of rotation of the two fans, as well as their relative speeds, can be regulated to suit any screenable material owing to the fact that these rotary fans are independently driven by separate pulleys.

The invention is not to be understood as being limited to the details herein shown and described, as such details may be varied widely, within the limits of mechanical skill, without departing from the essence or scope of the invention.

Having thus described my invention I claim and desire to secure by Letters Patent:

1. In a separator, the combination with a suitable casing, of a vertically disposed stationary screen within the said casing, a vertically disposed rotating fan arranged adjacent to said screen and provided with alternating reversely inclined blades all disposed in one circular plane and serving to produce alternating reversing or pulsating air currents, and means for supplying to the upper part of the separating means the material to be screened.

2. In a separator, the combination with a suitable casing, of a vertically disposed stationary screen within the said casing, a vertically disposed rotating fan arranged adjacent to said screen and provided with alternating reversely inclined blades, for the purpose of producing alternating reversing or pulsating air currents, means for supplying to the upper part of the separating means the material to be screened, and a second vertically arranged, rotary fan within and coöperating with the first-named fan and rotatable independently thereof.

3. In a separator, the combination with a suitable casing, of a vertically disposed stationary screen within the said casing, a vertically disposed rotating fan arranged adjacent to said screen and provided with alternating reversely inclined blades, for the purpose of producing alternating reversing or pulsating air currents, means for supplying to the upper part of the separating means the material to be screened, and a non-pulsating current, vertically arranged, rotary fan coöperating with the first-named fan and rotatable independently thereof.

4. In a separator, the combination with a suitable casing, of a vertically disposed stationary screen within the said casing, a vertically disposed rotating fan arranged adjacent to said screen and provided with alternating reversely inclined blades all disposed in one circular plane and serving to produce alternating reversing or pulsating air currents, means for supplying to the upper part of the separating means the material to be screened, and means for keeping separate and discharging the tailings and fine material.

5. In a separator, the combination with a suitable vertical casing, of a vertically disposed stationary screen within the said casing, a vertically disposed rotating fan arranged adjacent to said screen and provided with alternating reversely inclined blades all disposed in one circular plane and serving to produce alternating reversing or pulsating air currents, and said fan comprising an upper end head adapted to serve as a centrifugal distributer for the material to be screened, and means for supplying the material to be screened to said centrifugal distributer.

In testimony whereof I affix my signature, in presence of two witnesses.

THOMAS JOSEPH STURTEVANT.

Witnesses:
W. F. ELLIS,
L. H. STURTEVANT.

Copies of this patent may be obtained for five cents each, by addressing the "Commissioner of Patents, Washington, D. C."